(12) United States Patent  
Lessis

(10) Patent No.: US 7,650,830 B1
(45) Date of Patent: Jan. 26, 2010

(54) BENEFICIATED WATER SYSTEM

(75) Inventor: Gary Lessis, Kettering, OH (US)

(73) Assignee: Miracle Spring LLC, Cincinnati, OH (US)

( * ) Notice: Subject to any disclaimer, the term of this patent is extended or adjusted under 35 U.S.C. 154(b) by 763 days.

(21) Appl. No.: 11/205,478

(22) Filed: Aug. 17, 2005

Related U.S. Application Data

(60) Provisional application No. 60/602,961, filed on Aug. 19, 2004.

(51) Int. Cl.
*A47J 31/00* (2006.01)
*B05B 7/26* (2006.01)

(52) U.S. Cl. ............... 99/279; 99/295; 99/275; 222/145.5; 222/395; 239/310; 239/316; 239/317; 239/328

(58) Field of Classification Search .......... 99/323, 99/279, 275, 295; 239/310, 314, 316, 317, 239/328; 222/395, 145.5, 541.1, 565; 210/205, 210/206, 254, 433.1, 434, 449
See application file for complete search history.

(56) References Cited

U.S. PATENT DOCUMENTS

| | | | |
|---|---|---|---|
| 1,687,085 A | 10/1928 | Dow | |
| 1,991,388 A | 2/1935 | Healy | |
| 2,734,632 A | 2/1956 | De Ment | |
| 2,842,429 A | 7/1958 | Easton et al. | |
| 2,926,594 A * | 3/1960 | Werner et al. | 99/295 |
| 3,104,823 A * | 9/1963 | Hayes | 239/304 |
| 3,191,868 A | 6/1965 | Brown et al. | |
| 3,255,691 A | 6/1966 | Schwartz et al. | |
| 3,777,982 A | 12/1973 | Britton | |
| 4,634,053 A | 1/1987 | Herzfeld et al. | |
| 5,133,498 A | 7/1992 | Sealy et al. | |
| 5,211,973 A | 5/1993 | Nohren, Jr. | |
| 5,484,106 A * | 1/1996 | Gilmond | 239/317 |
| 5,816,135 A | 10/1998 | Ferri | |
| 5,954,272 A * | 9/1999 | Liao | 239/317 |
| 6,024,012 A | 2/2000 | Luzenberg, Jr. | |
| 6,029,699 A | 2/2000 | Granot | |
| 6,123,837 A | 9/2000 | Wadsworth et al. | |

(Continued)

FOREIGN PATENT DOCUMENTS

GB         2 204 253         11/1988
WO     WO 2004/013047 A3     2/2004

OTHER PUBLICATIONS

Screenshot "Flavor Options—Filtered water becomes flavored water with the push of a button," http://www.purflavoroptions.com/?scr=pg.com dated May 22, 2007.

*Primary Examiner*—Reginald L Alexander
(74) *Attorney, Agent, or Firm*—Frost Brown Todd LLC

(57) ABSTRACT

A system and method for the enhancement or fortification of a potable fluid. The system is adapted to fit on existing supplies of potable fluids, such as faucets, to permit the selective introduction of beneficiating materials into the liquid supply. The system includes interchangeable, replaceable cartridges. In one aspect of the invention, the system introduces a constant concentration of beneficiating material into the water supply. In another aspect, the system has the ability to permit discrete or continuously variable concentrations of the beneficiating material. The system may also include a water filtration device that may be operated either independently or cooperatively with the system.

13 Claims, 6 Drawing Sheets

U.S. PATENT DOCUMENTS

| | | |
|---|---|---|
| 6,409,099 B1 | 6/2002 | Goodwin et al. |
| 6,419,118 B1 | 7/2002 | Rees et al. |
| 6,419,166 B1 | 7/2002 | Brzezinski et al. |
| 6,453,799 B1 | 9/2002 | Kown |
| 6,457,589 B1 | 10/2002 | Poirier et al. |
| 6,541,055 B1 | 4/2003 | Luzenberg |
| 6,607,174 B2 | 8/2003 | Weber et al. |
| 6,698,464 B2 | 3/2004 | Hennemann, Jr. et al. |
| 6,797,156 B2 * | 9/2004 | Chau .......................... 210/94 |
| 6,926,821 B2 * | 8/2005 | Giordano et al. .............. 210/87 |
| 2004/0055948 A1 | 3/2004 | Blum et al. |
| 2005/0133420 A1 | 6/2005 | Rinker et al. |
| 2005/0133427 A1 | 6/2005 | Rinker et al. |
| 2005/0258082 A1 | 11/2005 | Lund et al. |
| 2006/0006107 A1 | 1/2006 | Olson et al. |
| 2006/0021919 A1 | 2/2006 | Olson et al. |
| 2006/0191824 A1 | 8/2006 | Arett et al. |

* cited by examiner

BENEFICIATED WATER SYSTEM

This application claims the benefit of the filing date of U.S. Provisional Application No. 60/602,961, filed Aug. 19, 2004.

BACKGROUND OF THE INVENTION

The present invention generally relates to a device for placing nutrients, flavorings or related ingredients into a water supply, and more particularly to a device that can inject accurate, repeatable quantities of such ingredients into a potable water stream.

The use of potable water, especially in bottled form, is in its ascendancy, where numerous products are commonly available, including those with minerals, flavorings or related additives. Nevertheless, the vast majority of water consumed today does not include such features, instead coming from a readily-available source in the form of a conventional faucet or tap. In one form, faucet-mounted systems employ filtration devices (including, for example, user-removable cartridges) to remove impurities from the water. While these work for their intended purposes, they do nothing to address the need to add ingredients to the water, in fact achieving just the opposite.

Presently, a consumer can mix in commercially available additives with dispensed tap water to create a flavored or fortified beverage directly from the faucet, rather than purchasing (often expensive) bottles of water and toting them home. While this convenience, coupled with low cost, represents a huge untapped market of potential users, its utility is limited by the inability to provide the tailored attributes of its bottled counterparts, as it is more difficult for the end-user to achieve consistent, repeatable mixing of additives into faucet-dispensed water to get the desired concentration of flavoring or nutrient unless a cumbersome measuring approach is employed. Such an exercise can be especially difficult for young children and people with physical or mental frailties.

Prior attempts at introducing supplemental materials have dealt with dissolving or leaching solids into flowing water. For example, fluoride and cleansers have been added into water flow. The device of Herzfeld et al., U.S. Pat. No. 4,634,053, shows a handle that is connectable to a hose. The handle is disclosed as being for cleaning or massaging purposes. The handle has no filter integrated with it, and the cartridge holding the concentrate does not appear to be disposable. In addition, the cartridge relies passively on the differing number and sizes of holes with which to dispense the concentrate. U.S. Pat. No. 3,777,982 to Britton, in addition to having no filter integrated with it, uses a block of liquid soluble material instead of a disposable cartridge. The stated purpose of the device is for cleaners, shampoos, detergents, fertilizers or insecticides. U.S. Pat. No. 3,191,868 to Brown et al. is attachable to a faucet, and injects its ingredient, primarily fluoride, by a leaching process rather than a disposable cartridge/bladder combination. As with the previous devices, there is no filter integrated with it. Other devices, including U.S. Pat. Nos. 2,842,429 (to Easton et al.), 2,734,632 (to De Ment), 1,991,388 (to Healy), 1,687,085 (to Dow) and UK Patent Application 2,204 253 (to Deeney et al.) all differ in the way in which additives are delivered with a water supply.

While these approaches to injecting materials into a water stream are currently being employed, their effectiveness is limited by one or more of the aforementioned problems and disadvantages. For example, none of the previously-discussed approaches incorporates a quickly and easily replaceable cartridge containing a beneficiation material such as flavors, vitamins, and other ingestible materials into the water flow. Moreover, the previous attempts do not use water pressure to act on a bladder containing a supply of beneficiation materials. Thus, what is needed is a device that is easily attached to a conventional water supply, such as a kitchen or related faucet, to provide repeatable quantities of on-demand beneficiated water. In the present context, a beneficiated liquid (such as water) is that which through the addition of one or more ingredients receives some form of fortification or related enhancement. What is further needed is such a device that may be integrated with a water filtration system. What is additionally needed is such a device configured with a beneficiating material-containing cartridge that is easily removable and replaceable, such that beneficiation of water can be achieved inexpensively.

SUMMARY OF THE INVENTION

These needs are met by the present invention, wherein a device for use in fluid systems without the aforementioned disadvantages is described. In accordance with one aspect of the present invention, a device for introducing ingredients into a potable fluid dispensing system is disclosed. The device includes a housing, a cartridge which can contain enhancement (also referred to as beneficiating) ingredients, and a flow mode selector for selectively allowing mixture of enhancement ingredients from the cartridge and a potable fluid flowing through the system. The enhancement ingredients can be, for example, a concentrated liquid or dissolvable solid. Specific types of such ingredients may include (but are not limited to) B, C or E vitamins, light flavoring, sweeteners, nutritional supplements, herbs, spices, proteins, fats, carbohydrates or the like. By way of example, the ingredients may include flavors, vitamins or nutrients or combinations thereof, and the device facilitates their introduction into the water flow for easy consumption. Delivery of beneficiated water according to this device is substantially less expensive than bottled water equivalents. In addition, rather than purchasing bottles that may not get recycled, the beneficiated water system delivers the end product directly into the user's container, thereby minimizing impact to the environment from containers and related packaging.

In one embodiment of the device, its configuration somewhat resembles that of a conventional faucet-mounted water filter, in that it is attachable to a faucet such that when the faucet is turned on, water passes through the device before being dispensed. In one mode of operation, the device can perform in a manner opposite such filters, since by its operation it is adding something to the water rather than taking something out. In another embodiment, the device may additionally include a filter such that it can perform both beneficiation and traditional filtration functions. This optional inclusion of filtration features gives the consumer yet another choice for modifying conventional tap water or other liquids.

One significant benefit of the present invention is its ability to provide ratiometric quantities of beneficiated product. As used in the present context, the term "ratiometric" is used to describe additive concentrations that are invariant with flow or pressure settings. Thus, when connected to a conventional faucet, the concentration of additive to the water is constant irrespective of input water pressure and corresponding water flow volume.

Optionally, the ingredient supply cartridge includes a substantially rigid outer shell removably attachable to the housing. As used in the present context, the term "substantially" refers to features that, while in theory would be expected to exhibit exact correspondence or behavior, may in practice embody something slightly less than exact. As such, the term denotes the degree by which a quantitative value, measurement or other related representation may vary from a stated reference without resulting in a change in the basic function of the subject matter at issue. In a preferred embodiment, the outer shell and housing are easily connectable (such as through latched, threaded, friction-based or locking fits, among others) such that tools are not required to secure the two together. The shell preferably holds a bladder, where the bladder can contain a quantity of the enhancement ingredients that can be forced out of the bladder and into a stream of water that can subsequently be dispensed to a user. When a supply of pressurized fluid (such as water from a conventional faucet) is introduced into the device, at least a portion of the fluid is routed to a region formed between the bladder and the shell. The space between the bladder and shell then fills up with water, which then presses against the bladder. Since the bladder is of a flexible and collapsible material, the pressure applied to it squeezes some of the ingredient out of the bladder and into a stream of potable fluid. The bladder may further be integrated into the ingredient supply cartridge such that together they define a single non-reusable unit, thereby promoting disposable operation.

The ingredients contained in the cartridge can be quickly and easily replaced by inserting a different cartridge with a different flavor and or nutrient combination based upon the preferences of the user. In addition to promoting variable concentration valving capability and consumer convenience through ease of use and tool-free replacement, the water pressure-based mixing across a bladder or related membrane and disposable cartridge construction promotes consumer confidence that the ingredients contained therein have not been tampered or otherwise contaminated.

Further options include the conduit having a major water flow configured to convey a first portion of the pressurized potable fluid for mixing with the enhancement ingredients, and a minor water flow configured to convey a second portion of the pressurized potable fluid to the region formed between the bladder and the shell. This second portion effects the bladder volume reduction and the displacement or expulsion of the enhancement ingredient from the bladder. A filter cartridge may be placed in selective fluid communication with the fluid inlet. This allows the water to become both filtered and beneficiated. The filter cartridge may further be disposed within the ingredient supply cartridge, and may be separately removable from the ingredient supply cartridge. In another form, the filter cartridge is integral with the ingredient supply cartridge such that together they define a single non-reusable unit.

The flow mode selector is preferably in the form of a valve that operates in a first and second setting. In a first setting, the valve bypasses the potable fluid around the ingredient supply cartridge such that no fluid communication and consequent mixing occurs, while in a second setting, the pressurized potable fluid can be introduced into the minor and major water flows to establish the enhancement ingredient dispensing and mixing.

The device may further include a concentration adjustment selector, also in the form of a valve. This valve is able to accommodate numerous settings, each permitting a different concentration of the enhancement ingredient to be mixed. In one form, the plurality of settings are discretely variable, while in another they are continuously variable. The valve (either in its continuous or discretely variable form) can further include an "on/off" setting such that the various concentration settings are only operative when the valve is in the "on" position.

In a preferable form, there are at least two fluid outlets in the housing, a first of which comprises a bypass spout through which the potable fluid that has not been mixed with the enhancement ingredients passes, and a second of which comprises a beneficiated spout through which the mixed enhancement ingredients and potable fluid passes.

According to another aspect of the invention, a replaceable cartridge for placing an enhancement ingredient into a pressurized potable water dispensing system includes a removably attachable and substantially rigid outer shell and a bladder disposed in the shell. As before, the bladder is made from a relatively flexible, collapsible material, making it responsive to pressure from the potable water. In this way, at least some of an enhancement ingredient contained within the bladder can be expelled and mixed with some of the potable water to create an enhanced potable water stream. As with the previous aspect, the potable fluid that interacts with the cartridge may be defined by first and second portions, where the first corresponds to the portion that mixes with the ingredient, while the second is using as the driving or pressurizing portion.

Optionally, the cartridge can be structured with an open architecture, where all of the portion of the fluid introduced into the cartridge may also be removed along a separate cartridge outlet. In this way, after the second portion of potable water passes between the bladder and the substantially rigid outer shell, it can be introduced into the stream containing the first portion of potable water. In addition to making substantially all of the water available for mixing with the ingredient, its open architecture helps prevent overpressure to the cartridge. In yet another option, the bladder is integrated into the substantially rigid outer shell such that together they define a single non-reusable unit. Such a configuration defines a truly disposable unit that can be inserted, removed and reinserted as needed until the ingredients have been depleted. As stated above, the enhancement ingredient can be flavorings, sweeteners, vitamins, herbs, spices, proteins, fats or carbohydrates or any combination of the aforementioned, and can be in liquid or solid (such as powdered solid) form, and the disposable nature of each cartridge is such that once the ingredient supply is depleted from each cartridge, it can be removed without the need for tools, and a new, fresh cartridge can be installed.

In another option, a filter is coupled to the replaceable cartridge so that upon passage of the potable water through the filter, at least a portion of the potable water becomes both filtered and beneficiated. In a more particular form, the filter is disposed within the substantially rigid outer shell. The filter cartridge can be made to be separately removable. In this way, the user has the ability to change out either the filter or the bladder without having to change out both simultaneously. Such a configuration is beneficial when the filter and bladder are used up at different rates. In another form, the filter and bladder are integral with the substantially rigid outer shell such that together they define a single non-reusable unit. What such a construction sacrifices in bladder and filter autonomy is made up for by overall user convenience, as replacement and renewal of a single cartridge covers both beneficiation and filtration needs.

According to yet another aspect of the invention, a beneficiated water system is disclosed. The system includes a water dispensing faucet that is used to control the flow of a pressurized supply of potable water, and a beneficiating ingredient dispensing device coupled to the faucet. The beneficiating ingredient dispensing device includes a housing similar to that described in the previous aspects, where a fluid conduit is intermediate a fluid inlet and at least one fluid outlet formed in the housing. The conduit includes a first water flow and a second water flow. The device also includes an ingredient supply cartridge coupled to the housing, and a flow mode selector as previously described. The portion of the water passing through the first water flow and the beneficiating ingredient mixes to form beneficiated water that is dispensed through the fluid outlet. The ingredient supply cartridge includes a substantially rigid outer shell removably attachable to the housing, and a bladder disposed in the ingredient supply cartridge, the bladder configured to contain a quantity of the beneficiating ingredient therein such that upon application of pressure thereto by a portion of the water passing through the first water flow, a region formed between the bladder and the substantially rigid outer shell expands to effect a volume reduction of the bladder and consequent displacement of at least a portion of the beneficiating ingredient disposed therein. While virtually any joined components can be considered "removable", in the present context, it will be understood that when applied to the presently-disclosed cartridge, only those cartridge that can be attached to or separated from a housing with minimal user effort are included. As such, a cartridge that can be connected and disconnected to a housing without the need for tools to effect such connection qualifies as a removable cartridge, while one that necessitates either damage to the components once separated or the extensive use of tools does not.

According to still another aspect of the present invention, a method of adding an ingredient into a potable water stream includes configuring a device to selectively mix the ingredient with at least a portion of the potable water stream, coupling the device to the potable water stream, initiating a flow of the potable water stream through the device and adjusting the device such that some of the potable water stream engages the bladder to expel some of the ingredient in the bladder. Upon exiting the bladder, this part of the ingredient mixes with some of the potable water stream to create a beneficiated stream. As previously discussed, the device may include a removably attachable cartridge with the ingredient-containing bladder disposed therein.

Optionally, initiating the flow of the potable water stream comprises turning on a faucet disposed in the potable water stream such that the potable water stream passes through the faucet. In addition, the removably attachable cartridge connects to a housing and the housing comprises at least one valve in the form of a concentration adjustment selector to allow a user to set a preferred level of ingredient concentration. In a more detailed option, the ingredient comprises a human oral ingestion ingredient. In the present context, a human oral ingestion ingredient includes those taken through the oral route, such as by eating or drinking, and that are suitable for human consumption. In the present context, herbicides, insecticides, cleaning agents or the like do not fall within the range of human oral ingestion ingredients. Examples of suitable human oral ingestion ingredients that could be placed within the bladder include vitamins, flavorings, sweeteners, nutritional supplements, herbs, spices, proteins, fats and carbohydrates.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
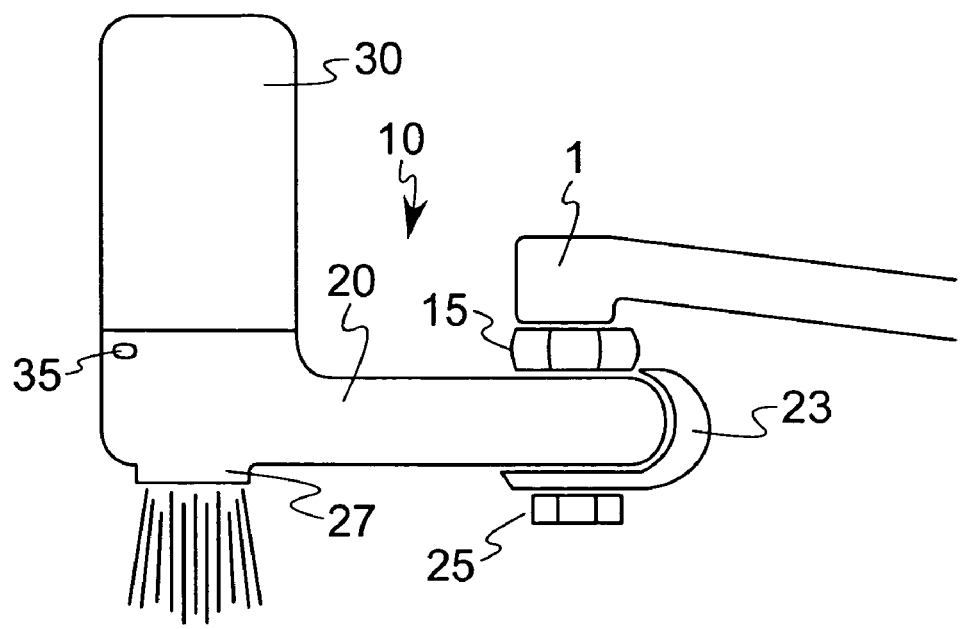
FIG. 1 is an elevation view of the beneficiated water system according to an embodiment of the present invention.

Referring first to FIG. 1, a beneficiated water system 10 according to an aspect of the present invention is shown. In the present aspect, the system 10 is configured to introduce beneficiating or related enhancement ingredients or materials into a fluid dispensing system, such as a potable water supply, the latter of which is shown in the form of water faucet 1. The system 10 can be mounted to faucet 1 with faucet connector 15, and includes a housing 20, flow mode selector 23 and ingredient supply cartridge 30. Faucet connector 15 includes threads (not shown) that can be screwed onto matching threads of water faucet 1. In this way, water passing through faucet 1 enters housing 20 through fluid inlet 21. Ingredient supply cartridge 30 is configured as a disposable (i.e., one-time use) unit that can be thrown away once the supply of beneficiating ingredient inside is exhausted. In the embodiment shown, the ingredient supply cartridge 30 can be latched to the housing 20, in which case the ingredient supply cartridge 30 is easily and quickly removed from the housing 20 by depressing a cartridge release button 35 and pulling up on the ingredient supply cartridge 30. In one form, the cartridge release button 35 includes a spring-biased hook or related catch (not shown) that can engage a corresponding detent 36 (shown in FIG. 2) or recess (not shown) such that when a user depresses the cartridge release button 35, the bias is overcome and the detent 36 or notch (depending on the configuration) releases from the complementary part in the housing 20. It will be appreciated by those skilled in the art that other well-known methods of attaching the ingredient supply cartridge 30 to the housing 20 fall within the scope of the present invention, including (but not limited to) threaded screw connections, rotatable locking arrangements, snap-fit connections or the like. A flow mode selector 23, which is preferably in the form of a valve and discussed in more detail below, can be moved between a bypass mode and a beneficiated mode, where the latter forces the potable water to engage with ingredient supply cartridge 30. Fluid outlets, shown presently in the form of bypass spout 25 and beneficiated spout 27, can be selected by flow mode selector 23.

To provide beneficiation to the water flow coming out of faucet 1, the water flow can be broken up into two or more streams within conduit 26. In this way, one of the streams (or flowpaths) may be used to provide the driving force necessary to eject the beneficiating ingredients, while another can make up a stream with which the ejected ingredient may be mixed. An example of bifurcating the streams of water passing through faucet 1 and the beneficiated water system 10 attached thereto can be seen by referring next to FIGS. 2 and 3, where the input potable water flow is split into two separate streams within the housing 20, including a major water flow 26*a* (in the form of a primary flowpath) that flows into mixing vessel 28 and a minor water flow 26*b* (in the form of a secondary flowpath) that flows into the ingredient supply cartridge 30. A bladder 32 disposed within ingredient supply cartridge 30 contains the beneficiating ingredient, and is responsive to pressure changes brought about by the introduction of water via the minor water flow 26*b*. The bladder 32 forms a protective pouch to contain the beneficiating ingredient in such a way as to minimize the chances of contamination or tampering. The ingredient supply cartridge 30 includes a shell 31 to act as a relatively rigid container for bladder 32 such that upon the introduction of fluid to force ingredients from bladder 32, the pressurizing effect of the fluid preferentially deforms the bladder 32 rather than the shell 31 of ingredient supply cartridge 30. By being at least relatively rigid, the ingredient supply cartridge 30 is easier for a user to handle when during insertion and removal from housing 20. Either or both of the ingredient supply cartridge 30 and bladder 32 can be made to be disposable, thereby facilitating simple removal and replacement once the supply of beneficiating ingredient has been depleted. In one form, the bladder 32 can be sealingly placed within the ingredient supply cartridge 30 such that the combination forms a disposable (i.e., non-reusable) device. Such a configuration would provide additional resistance to tampering or the introduction of contaminants into the supply of beneficiating ingredient. In another, the ingredient supply cartridge 30 can be formed as a reusable part, while the bladder 32 can be inserted into and removed from the cartridge. Such a configuration could be used as a low-cost alternative.

Figure 3:
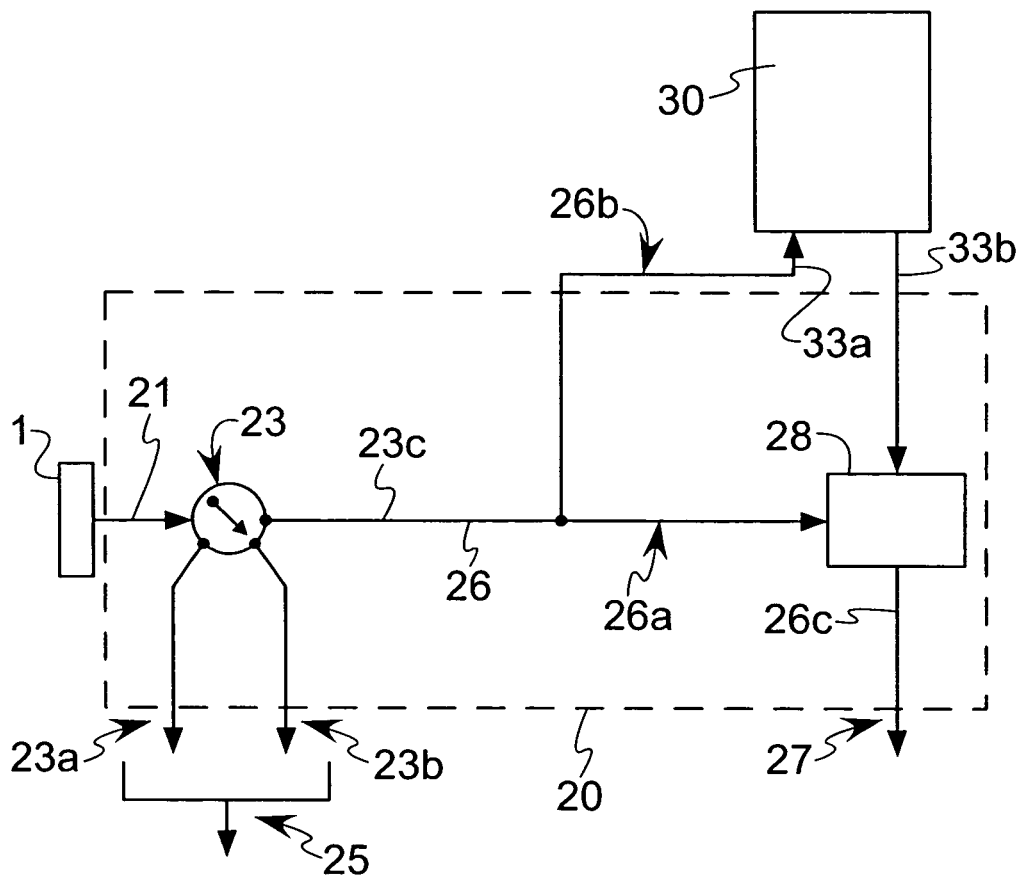
FIG. 3 is a schematic view of the flow of fluids through the system of FIG. 1.

Referring with particularity to FIG. 3, the minor water flow 26*b* portion enters the ingredient supply cartridge 30 through its inlet port 33*a*. The minor water flow 26*b* is ported into the ingredient supply cartridge 30 between the shell 31 of the ingredient supply cartridge 30 and the bladder 32 containing the concentrated beneficiating ingredients. The minor water flow 26*b* provides the volume of liquid which displaces an equivalent volume of concentrate contained in the bladder 32 when the waterflow is active. Use of the minor water flow 26*b* is beneficial in that by relying on the inherent pressure present in the water supply, it removes the necessity to separately pressurize the cartridge or incorporate electric or magnetic dispensing devices, thereby greatly simplifying the construction of the device. The beneficiating material flows out of the ingredient supply cartridge 30 via the outlet port 33*b*, then into mixing vessel 28 within the housing 20, where it is mixed with water from primary flowpath 26*a*, creating the combined flowpath 26*c* of potable water and beneficiating material that exits through the outlet in the form of beneficiated spout 27. Flow mode selector 23 has numerous settings, including bypass mode with no spray 23*a*, bypass mode with spray 23*b* and beneficiated mode 23*c*. When in either of the bypass mode with no spray 23*a* or the bypass mode with spray 23*b*, the potable water exits through bypass spout 25, whereas when in beneficiated mode 23*c*, the mixture of potable water and beneficiating material exits through beneficiated spout 27.

While both the major and minor water flows 26*a*, 26*b* emanate from the same conduit 26 that carries potable water passing through faucet 1, it will be appreciated by those skilled in the art that the two streams could come from different sources. In one such example, the minor water flow 26*b* need not be from a potable water supply, as it does not come in contact with either the major water flow 26*a* or the ingredients inside bladder 32. In another configuration in where the portion of the water conveyed by minor water flow 26*b* is potable (such as that presently shown), such portion could be returned to either the main conduit 26 or to major water flow 26*a* (neither of which configuration is shown) in order to form part of the beneficiated stream passing through beneficiated spout 27.

As mentioned above, the bladder 32 of ingredient supply cartridge 30 is configured to contain the beneficiating material, which while capable of existing in various forms as previously mentioned, is preferably of a concentrated liquid solution. Also as previously mentioned, there are numerous examples of the enhancement ingredients that can be used, including flavors, sweeteners, vitamins, nutritional supplements, herbal substances, medications (prescribed or over the counter), carbohydrates, proteins, fats, spices, juices or the like. The lower portion of shell 31 has the aforementioned inlet and outlet ports 33*a*, 33*b* which connect to appropriate fittings or related ports (not shown) within the housing 20. In one form, the inlet and outlet ports 33*a*, 33*b* can include a frangible membrane that upon mounting to the corresponding fitting on housing 20, may be pierced to allow respective fluid and pressure communication between the ingredients stored within bladder 32 and minor water flow 26*b* and major water flow 26*a*. The ingredient supply cartridge 30 is easily and quickly inserted onto the housing 20 by aligning the ingredient supply cartridge 30 so the cartridge inlet port 33*a* and outlet port 33*b* align and connect with the fittings of housing 20. A simple connection permits and pressing down on the ingredients supply cartridge 30 until the cartridge locks into place with detent 36 formed in cartridge inlet port 33*a* and outlet port 33*b*, where detent 36 extends laterally from outlet port 33*b*, and can form a locking relationship with a complementary part (such as a spring-biased notch or the like) cooperative with the cartridge release button 35. An audible snap can be heard when the connection has been made. The O rings 34 on the cartridge inlet port 33*a* and cartridge outlet port 33*b* help seal the cartridge to the housing 20 when the ingredient supply cartridge 30 is engaged.

Figure 2:
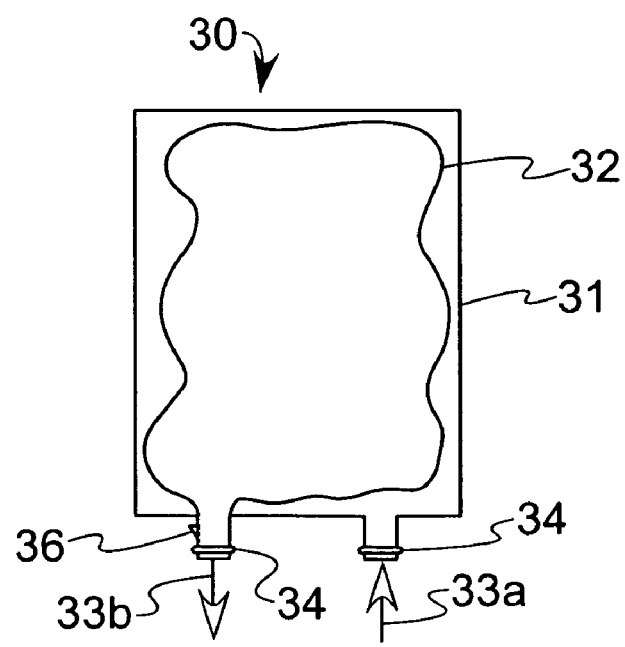
FIG. 2 is a detail of an ingredient supply cartridge that forms part of the invention of FIG. 1.

Referring with particularity to FIG. 2, it will be appreciated by those skilled in the art that there are multiple ways to use water pressure and volume to provide the driving force necessary to promote introduction of the beneficiating material into mixture with the potable water supply. For example, another approach is to employ a piston-like fixture (not shown) within the ingredient supply cartridge 30. The piston would press the beneficiating material out and would move downward vertically as it was being activated. In such case, the cartridge inlet port 33*a* flow is routed to an area above the piston such that the piston could move in an amount equivalent to the volume of water that was filled above the piston. Similarly, a diaphragm could be used in place of the piston.

There are a number of ways to prevent dripping of the beneficiating ingredient from the ingredient supply cartridge 30 when it is not engaged with the housing 20. One of the possible ways (not presently shown) is for the ingredient supply cartridge 30 to contain tubes that would pierce through a rubber film, in a manner similar to a needle piercing through a vial of medications. When the ingredient supply cartridge 30 is removed, the rubber seal closes back up, preventing leakage. Another way to help prevent leakage is to place the output of bladder 32 such that its egress is from the top.

Conduit would port the output from the top to the cartridge outlet port 33b. Similarly, the cartridge inlet port 33a flow may be routed to the top of the cartridge 30 in an effort to minimize leakage of the water from the cartridge when the cartridge is removed. In another configuration, a spring loaded valve (such as a sliding or rotary valve) could be included in the cartridge 30 such that when the cartridge 30 is disengaged from housing 20, the inlet port 33a and outlet port 33b would be sealed to prevent dripping. When the cartridge 30 is engaged, the valve would be recessed and allow the fluids to enter and exit the cartridge 30.

Figure 4:
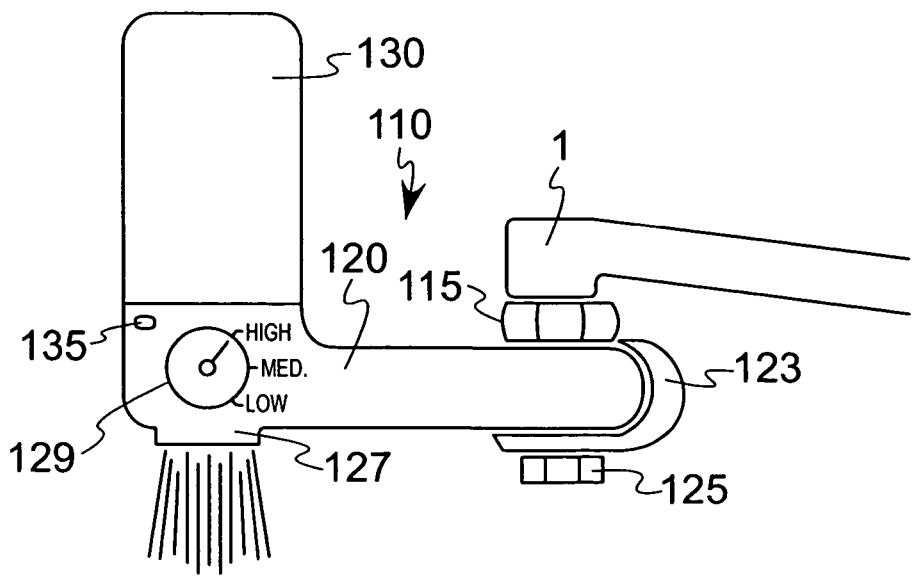
FIG. 4 is an elevation view of an alternate embodiment of the system of the present invention, further incorporating a discretely variable flow mode selections for adjusting the concentration setting of a beneficiating ingredient.
Figure 5:
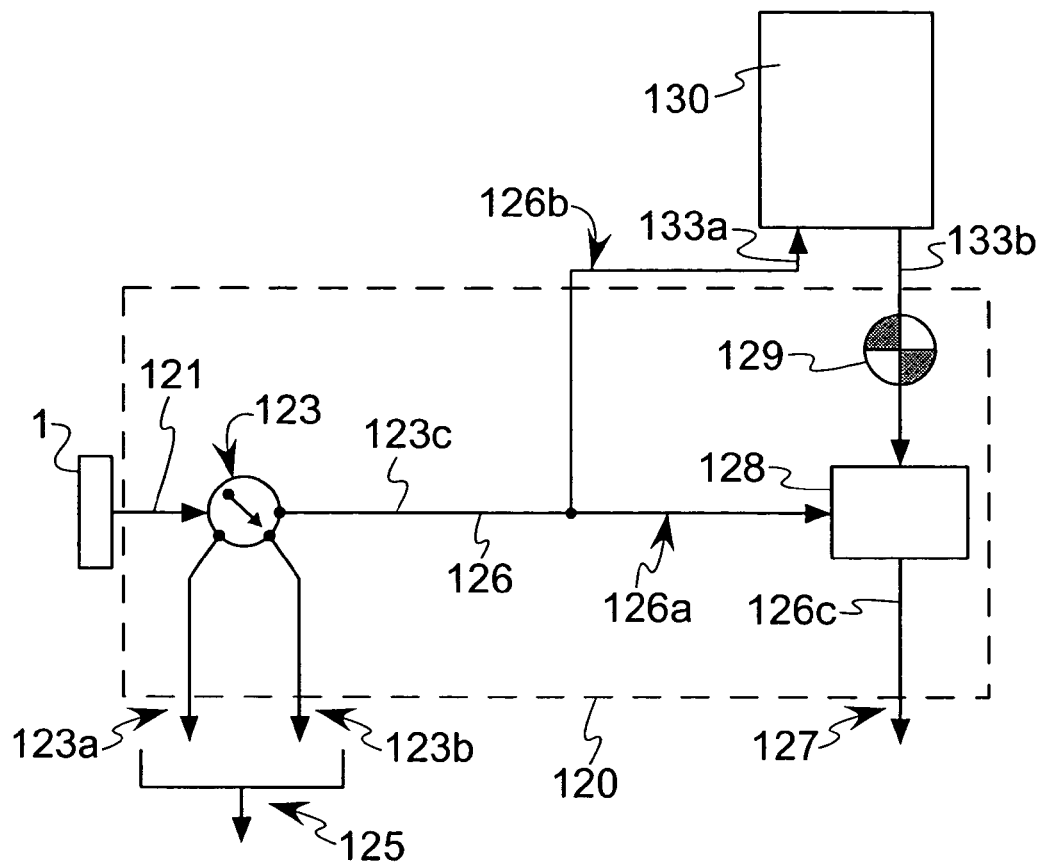
FIG. 5 is a schematic view of the flow of fluids through the system of FIG. 4.

Referring next to FIGS. 4 and 5, a beneficiated water system 110 according to another aspect of the present invention is shown. The present aspect is similar to that of FIG. 1, with the exception that the concentration of beneficiating material can varied according to the user's needs through concentration adjustment selector 129. The concentration adjustment selector 129 is a valve that opens and closes the flow from the cartridge outlet port 133b and the mixing vessel 128. While the selector 129 is presently shown as capable of providing three discrete concentration settings (specifically, "low", "medium" and "high"), it will appreciated by those skilled in the art that continuously variable concentrations (as will be discussed below) is also possible, where concentration adjustment selector 129 may be positioned anywhere between low and high limits. Concentration adjustment selector 129 is disposed downstream of ingredient supply cartridge 130 such that it varies the amount of beneficiating material permitted to enter mixing vessel 128. Thus, by positioning the concentration adjustment selector 129 to the "low" setting will reduce the cartridge outlet port 133b flow to the mixing vessel 128, providing a low amount of beneficiation. Similarly, by positioning the concentration adjustment selector 129 to the "medium" setting will open the flow slightly compared to the low setting, thereby reducing back pressure and providing for greater flow from the cartridge outlet port 133b flow to the mixing vessel 128. This selection mode provides a medium amount of beneficiation. Likewise, positioning the concentration adjustment selector 129 to the "high" setting will completely open the flow, providing for the greatest flow from the cartridge outlet port 133b flow to the mixing vessel 128. This selection mode provides the greatest concentration of beneficiation. The concentration adjustment selector 129 and the flow selector 123 work in conjunction with one another such that in situations where beneficiation is desired, flow selector 123 is positioned in a beneficiated mode to allow an amount of beneficiation determined by concentration adjustment selector 129 to be selected. Similarly, in situations where no beneficiation is desired, flow selector 123 is positioned in a non-beneficiated mode, thereby routing the flow of water passing through fluid inlet 121 through bypass mode without spray 123a or bypass mode with spray 123b, either to exit via bypass spout 125.

Figure 6:
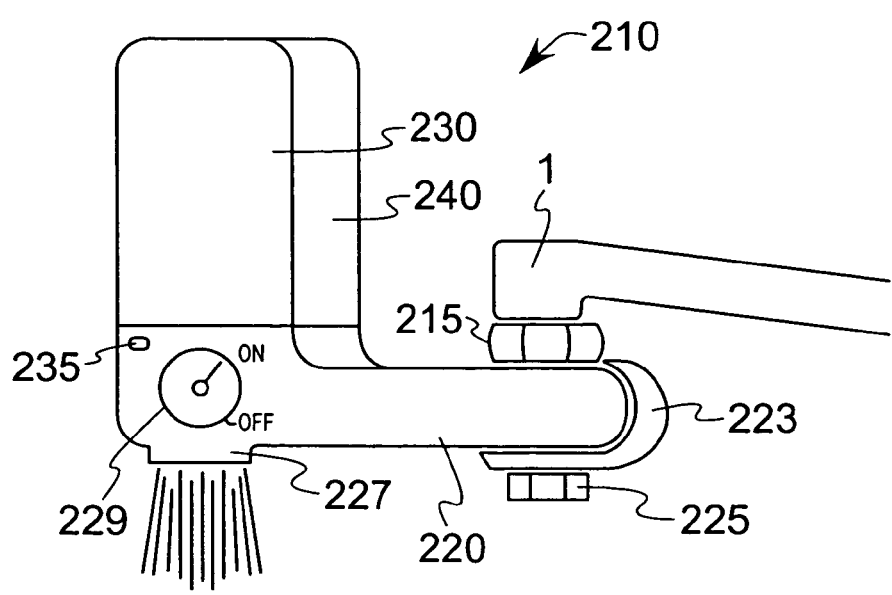
FIG. 6 is an elevation view of an alternate embodiment of the system of the present invention, further incorporating a filtration device.
Figure 7:
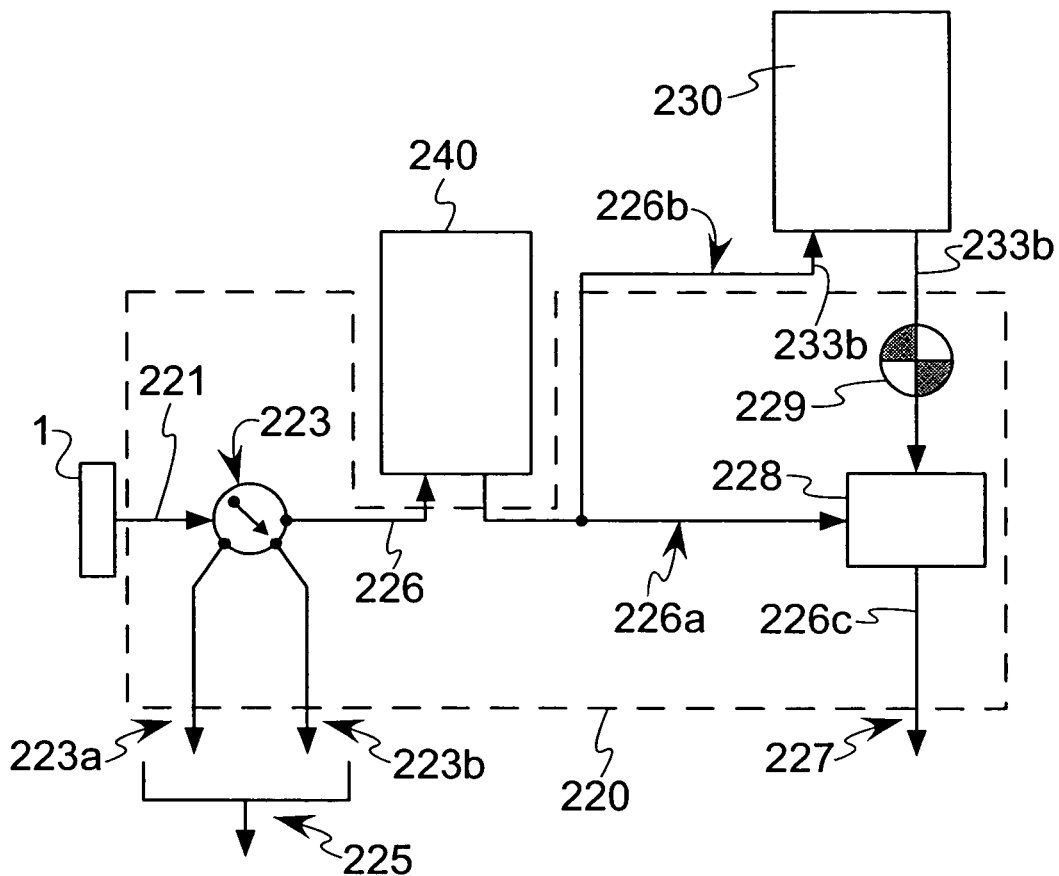
FIG. 7 is a schematic view of the flow of fluids through the system of FIG. 6.

Referring next to FIGS. 6 and 7, a beneficiated water system 210 according to another aspect of the present invention is shown, now including an integrated filter 240 with constant beneficiating material concentration. As with the ingredient supply cartridge 230, filter 240 is easily and quickly removed and replaced. In the present aspect, the concentration adjustment selector 229 has two settings: either on or off. In the "on" position, the system 210 is configured to provide both filtration and beneficiation of the water, while in the "off" position, filtration only. Thus, if the concentration adjustment selector 229 is in the "off" position, no beneficiation material will pass to the mixing vessel 228. In contrast, if the concentration adjustment selector 229 is in the "on" position the beneficiation process proceeds with constant concentration. While the filter 240 is shown upstream of a bifurcation point between the major and minor water flows 226a and 226b in conduit 226, it will be appreciated by those skilled in the art that the filter 240 can be placed downstream of such point as well. The flow selector 223 works in a manner similar to that of the flow selector 123 of the previous aspect.

Figure 8:
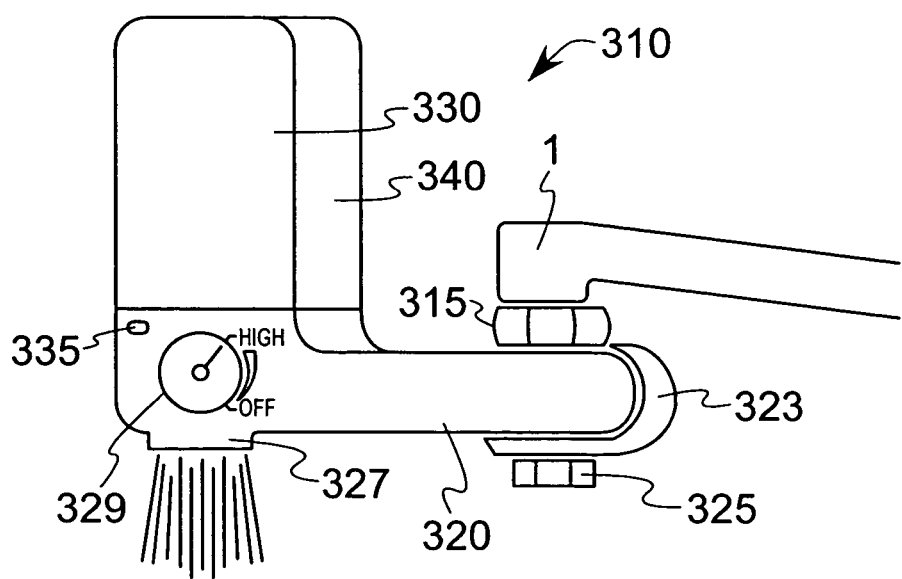
FIG. 8 is an elevation view of an alternate embodiment of the system of FIG. 4, further including a filtration device and a continuously variable concentration setting switch.
Figure 9:
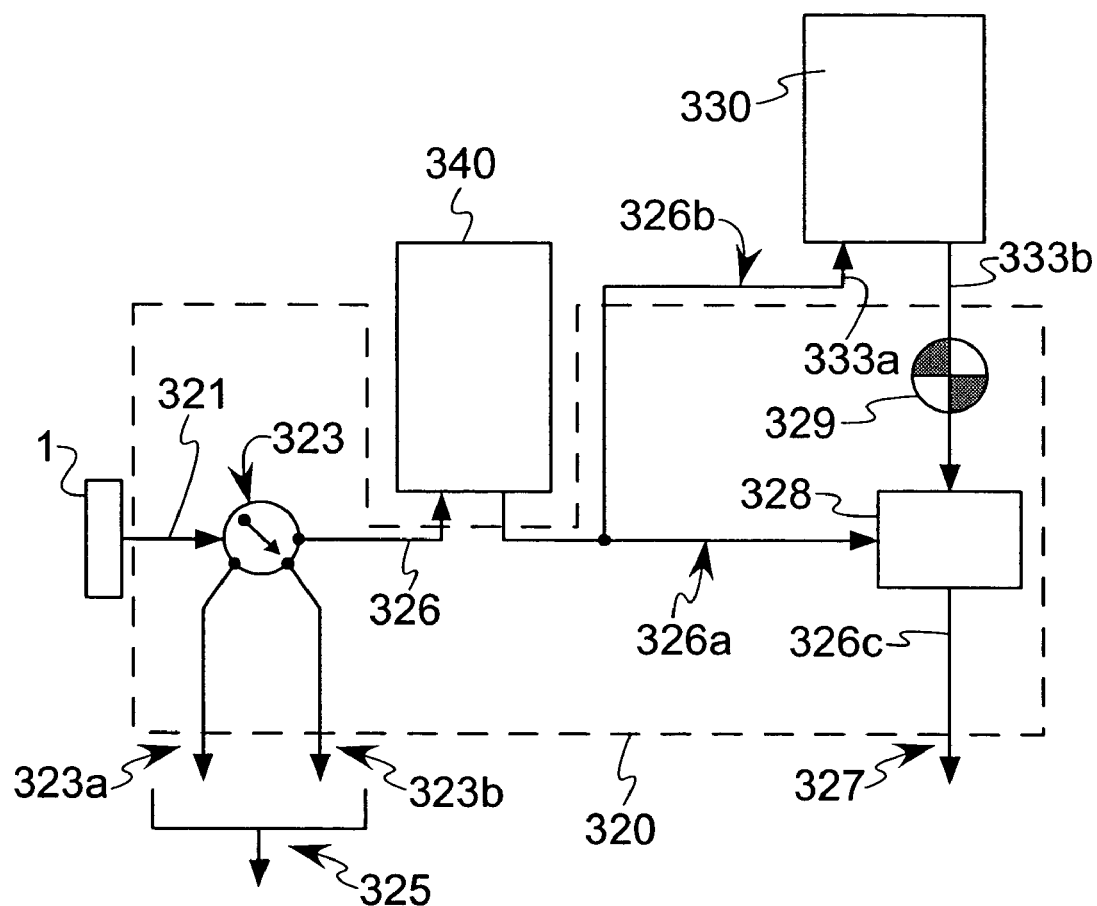
FIG. 9 is a schematic view of the flow of fluids through the system of FIG. 8.

Referring next to FIGS. 8 and 9, a beneficiated water system 310 according to another aspect of the present invention is shown, now including an integrated filter 340 with the ability to deliver variable beneficiating material concentration through continuously variable concentration adjustment selector 329. The concentration adjustment selector 329 includes both "on" and "off" positions, similar to that of the selector of FIG. 6; however, variable concentrations of beneficiating materials may now be controlled. The concentration adjustment selector 329 may be positioned to be off, or when turned on, anywhere between low and high limits. In this situation, if flow selector 323 is turned to the "on" position, (such that it is set to the filter/beneficiate mode), the water will flow through conduit 326, even if the concentration adjustment selector 329 is in the "off" position, so that the water can be filtered through integrated filter 340. When the concentration adjustment selector 329 is in the "on" position, the water passing through conduit 326 can be both filtered and beneficiated.

As with the system 10 of FIG. 4, the present system 310 may alternately utilize a selector to allow discrete controlling of beneficiating material concentration, using for example, "low", "medium" and "high" settings in addition to an "off" setting. As can be seen, if the flow selector 323 is positioned to allow filtration and beneficiation, the waterflow is always filtered but may or may not be beneficiated, as the on/off concentration setting on selector 329 still permits bypass of the beneficiating materials in ingredient supply cartridge 330. For example, if the selector 329 is positioned in the "off" position, no beneficiating material will pass to the mixing vessel 328. Positioning the concentration adjustment selector 329 to the "low" setting will reduce the cartridge outlet port 333b flow to the mixing vessel 328. This selection mode provides a low amount of beneficiation. Positioning the concentration adjustment selector 329 to the "medium" setting will open the flow slightly compared to the "low" setting, providing for greater flow from the cartridge outlet port 333b flow to the mixing vessel 328. Positioning the concentration adjustment selector 329 to the "high" setting will completely open the flow and thus provide for the greatest flow from the cartridge outlet port 333b flow to the mixing vessel 328.

Figure 10:
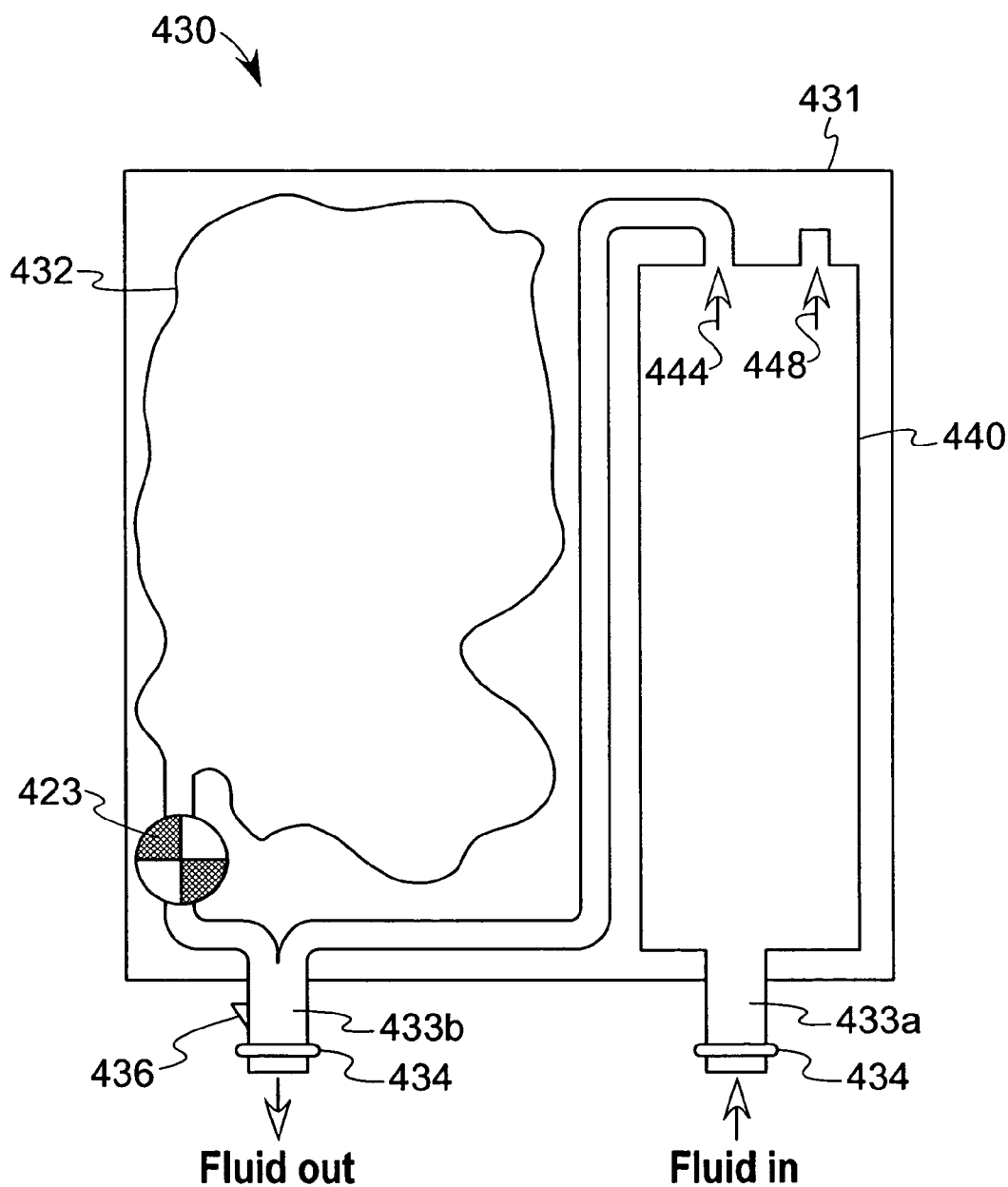
FIG. 10 is a detail of a replaceable cartridge having both ingredient supply and filtration features.

Referring next to FIG. 10, another embodiment of the present invention where the beneficiation and filtration devices 432, 440 are integrated into a common cartridge 430. As with the previous embodiments, this integrated cartridge 430 can be made to be user-replaceable. Also, in a manner similar to that of the cartridge 30 of FIG. 2, the O rings 434 on the cartridge inlet port 433a and cartridge outlet port 433b help seal the cartridge to the housing (not presently shown) when the ingredient supply cartridge 430 is engaged. In this case, the substantial entirety of water passing through the conduit of the housing (neither of which are presently shown) enters the cartridge 430 through inlet port 433a and is first filtered in filter 440. The output of the filter 440 is split, where a first filter output 444 is fluidly connected to outlet port 433b, while a second filter output 448 opens up to the volume defined between the outer shell 431 and bladder 432 containing the enhancement ingredient (in the form of concentrate or the like). In this way, the water flowing through the second filter output 448 functions in a manner similar to that of earlier-described the minor water flow (for example, minor water flow 26b shown in FIG. 3), where the water flowing out of the second filter output 448 displaces an equivalent volume of enhancement ingredient contained in the bladder 432. Different flow mode selector 423 configurations are available, preferably including a valve that opens and closes the flow from the bladder 432 to the outlet port 433b. In a first form, the flow mode selector 423 can be a simple "on/off" valve, where in the "on" position, a constant ratiometric concentration of the beneficiated solution is output. In the "off" position, no enhancement ingredient is forced out of the bladder, thereby producing only filtered water at the outlet port 433b. In a second form, the flow mode selector 423 can be a variable valve with either discrete or continuously variable settings. In one form, the valve has four positions: high, medium, low, and off. While the selector is presently shown as capable of providing three discrete concentration settings (specifically, "low", "medium" and "high", such as shown in the variant in FIG. 4), it will appreciated by those skilled in the art that continuously variable concentrations (as shown in the variant in FIG. 8 and as will be discussed in more detail below) is also possible.

In all of the configurations depicted herein, the output is ratiometric so that the concentration of enhancement ingredients is constant irrespective of the water pressure through the system. For example, if the selector is positioned in the "low" setting, the concentration output will be constantly low over the entire spectrum of the input water pressure. In the "low" setting, a significant back pressure exists, thereby limiting the amount of force the water can put on the bladder 432. Higher settings (corresponding to the "medium" and "high" positions of the flow mode selector 423) enable larger openings with lower and lower values of backpressure. For example, referring again to FIGS. 2 and 3, the ratiometric output is generated because the main water flow in conduit 26 is split into a major water flow 26a and minor water flow 26b. The volume of the minor water flow 26b passes between the cartridge shell 31 and the bladder 32 containing the beneficiating material therein. Changes in water pressure flowing through conduit 26 produces concomitant changes in the major and minor water flows 26a, 26b. Thus, when the water pressure is turned to a higher level (such as by turning the faucet 1 to a higher setting), more water from the minor water flow 26b is diverted to the space between the shell 31 and bladder 32, thus forcing a proportional amount of the beneficiating material out of the bladder 32 and into the mixing vessel 28. Therefore, the concentration of the output is constant irrespective of the input water pressure.

The foregoing detailed description and preferred embodiments therein are being given by way of illustration and example only; additional variations in form or detail will readily suggest themselves to those skilled in the art without departing from the spirit of the invention. Accordingly, the scope of the invention should be understood to be limited only by the appended claims.

I claim:

1. A device for a potable fluid dispensing system, said device comprising:
    a housing fluidly attachable to a pressurized source of potable fluid, said housing defining therein a fluid inlet, at least one fluid outlet and conduit configured to convey a potable fluid from said pressurized source of potable fluid between said inlet and outlet;
    an ingredient supply cartridge coupled to said housing, wherein said ingredient supply cartridge comprises a substantially rigid outer shell removably attachable to said housing without the need for tools to effect such removable attachment, wherein said ingredient supply cartridge further comprises a bladder disposed in said ingredient supply cartridge, said bladder configured to contain a quantity of an enhancement ingredient therein; and
    a flow mode selector configured to place said enhancement ingredient disposed in said bladder into selective fluid communication with a first portion of said potable fluid such that during periods when said fluid communication is established between at least a portion of said enhancement ingredient and said first portion of said potable fluid, they mix to form an enhanced potable fluid that is dispensed from said device through said at least one fluid outlet, wherein during said periods of established fluid communication, a second portion of said potable fluid fills a region formed between said bladder and said substantially rigid outer shell to effect a volume reduction of said bladder and consequent displacement of said at least a portion of said enhancement ingredient disposed therein into said first portion of said potable fluid to form said enhanced potable fluid.

2. The device of claim 1, wherein said bladder is integrated into said ingredient supply cartridge such that together they define a single non-reusable unit.

3. The device of claim 1, wherein said conduit comprises:
    a major water flow configured to convey said first portion of said potable fluid for mixing with said enhancement ingredient; and
    a minor water flow configured to convey said second portion of said potable fluid to said region formed between said bladder and said substantially rigid outer shell such that said second portion effects said bladder volume reduction and said displacement of said at least a portion of said enhancement ingredient.

4. The device of claim 3, further comprising a filter cartridge placed in selective fluid communication with said fluid inlet such that upon passage of said first portion of said potable fluid through said filter cartridge, at least said major water flow becomes both filtered and beneficiated.

5. The device of claim 3, wherein said filter cartridge is disposed within said ingredient supply cartridge.

6. The device of claim 5, wherein said filter cartridge is separately removable from said ingredient supply cartridge.

7. The device of claim 5, wherein said filter cartridge is integral with said ingredient supply cartridge such that together they define a single non-reusable unit.

8. The device of claim 3, wherein said flow mode selector comprises a valve that in a first setting bypasses said potable fluid around said ingredient supply cartridge such that no said fluid communication and consequent mixing occurs, and in a second setting permits the introduction of said potable fluid into said minor and major water flows.

9. The device of claim 8, further comprising a concentration adjustment selector having a plurality of settings configured to allow a user-defined level of said enhanced potable fluid.

10. The device of claim 9, wherein said plurality of settings are discretely variable.

11. The device of claim 9, wherein said plurality of settings are continuously variable.

12. The device of claim 8, wherein said at least one fluid outlet comprises a plurality of fluid outlets, a first of which comprises a bypass spout through which said potable fluid that has not been mixed with said enhancement ingredient passes, and a second of which comprises a beneficiated spout through which said mixed enhancement ingredient and potable fluid passes.

13. A beneficiated water system comprising:
a water dispensing faucet connectable to a pressurized supply of potable water; and
a beneficiating ingredient dispensing device coupled to said faucet, said device comprising:
a housing defining therein a fluid inlet, at least one fluid outlet and conduit intermediate said inlet and outlet, said conduit defining a first water flow and a second water flow;
an ingredient supply cartridge removably attachable to said housing, said ingredient supply cartridge comprising a bladder disposed therein, said bladder configured to contain a quantity of beneficiating ingredient therein such that upon application of pressure thereto by a portion of said water passing through said second water flow to said bladder, said bladder expels at least a portion of said beneficiating ingredient disposed therein into mixing relationship with a portion of said water passing through said first water flow; and
a flow mode selector configured to vary said application of pressure such that in a first state, the water passing through said at least one fluid outlet is substantially non-beneficiated, while in a second state is beneficiated.

* * * * *